US009130959B2

(12) United States Patent
Memon et al.

(10) Patent No.: US 9,130,959 B2
(45) Date of Patent: Sep. 8, 2015

(54) METHOD AND APPARATUS FOR MONITORING A KAD NETWORK

(75) Inventors: Ghulam Muhammad Memon, Eugene, OR (US); Yang Guo, Princeton Junction, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 175 days.

(21) Appl. No.: 12/998,389

(22) PCT Filed: Oct. 30, 2008

(86) PCT No.: PCT/US2008/012288
§ 371 (c)(1),
(2), (4) Date: Apr. 13, 2011

(87) PCT Pub. No.: WO2010/050912
PCT Pub. Date: May 6, 2010

(65) Prior Publication Data
US 2011/0202652 A1 Aug. 18, 2011

(51) Int. Cl.
*G06F 15/173* (2006.01)
*H04L 29/08* (2006.01)
*H04L 12/26* (2006.01)
*G06F 15/16* (2006.01)
*H04L 12/24* (2006.01)

(52) U.S. Cl.
CPC .............. *H04L 67/104* (2013.01); *H04L 43/10* (2013.01); *H04L 67/22* (2013.01); *H04L 41/12* (2013.01)

(58) Field of Classification Search
CPC ....... H04L 67/22; H04L 67/104; H04L 43/10; H04L 41/12

USPC .......................................................... 709/224
See application file for complete search history.

(56) References Cited

U.S. PATENT DOCUMENTS

| 2004/0098447 | A1* | 5/2004 | Verbeke et al. ............... 709/201 |
| 2005/0163050 | A1 | 7/2005 | Hopkins |
| 2008/0059441 | A1* | 3/2008 | Gaug et al. ....................... 707/4 |
| 2008/0189406 | A1 | 8/2008 | Shen |
| 2009/0100137 | A1* | 4/2009 | Venkitaraman et al. ...... 709/205 |
| 2009/0122724 | A1* | 5/2009 | Rosenberg .................... 370/255 |
| 2009/0216910 | A1* | 8/2009 | Duchesneau ................. 709/250 |

FOREIGN PATENT DOCUMENTS

| WO | WO2006131909 | 12/2006 |
| WO | WO2008065496 | 6/2008 |

OTHER PUBLICATIONS

Moritz Steiner et al., Load Reduction in the KAD Peer-to-Peer System, 2007, pp. 1-11.*

(Continued)

*Primary Examiner* — Joseph Greene
(74) *Attorney, Agent, or Firm* — Robert D. Shedd; Jerome G. Schaefer

(57) ABSTRACT

A method and apparatus are described including determining if a received message is from a monitored peer, forwarding the received message to a coordinator responsive to said determination, determining if the received message is a request message, opening a port for the peer responsive to the second determination, forwarding the request message to a monitored peer via the opened port and forwarding a response message to the monitored peer responsive to the second determination.

7 Claims, 6 Drawing Sheets

(56) References Cited

OTHER PUBLICATIONS

Steiner et al.:"Load Reduction in the KAD Peer-to-Peer System," Institut Eurocom, Sophia-Antipolis, Frances, University of Mannheim Germany, Sep. 23, 2007.

Steiner et al.:"Actively Monitoring Peers in KAD," Institut Eurocom, Sophia-Antipolis, France, Feb. 26, 2007, pp. 1-6.

Maymoukov et al.:"Kademlia: A Peer-to-Peer Information System Based on the XOR Metric," New York University, IPTPS 2002, Mar. 7, 2002, pp. 53-65.

Search Report Dated Aug. 19, 2009.

* cited by examiner

METHOD AND APPARATUS FOR MONITORING A KAD NETWORK

This application claims the benefit, under 35 U.S.C. §365 of International Application PCT/US2008/012288, filed Oct. 30, 2008, which was published in accordance with PCT Article 21(2) on May 6, 2010 in English.

FIELD OF THE INVENTION

The present invention relates to peer-to-peer networks generally and, in particular, to a method and apparatus for monitoring the performance of a peer-to-peer network with minimal impact on the overlay topology and performance of the monitored peer-to-peer network.

BACKGROUND OF THE INVENTION

As used herein, "/" denotes alternative names for the same or similar components or structures. That is, a "/" can be taken as meaning "or" as used herein. A Kad network is a specific type of peer-to-peer (P2P) network. Kad is related to Kademlia. A Kad-type network is considered a third generation P2P network. First generation P2P networks relied on a central repository to coordinate lookups on the P2P network including lookups for peer locations and lookups for content location. Second generation P2P networks did not rely on a central unit/node or repository to perform lookups but rather flooded the P2P network in search of content. Third generation P2P networks such a Kad and Kademlia use distributed hash tables to locate content in the P2P network. It is, of course, extremely desirable to locate content quickly.

Given that as background, one might wish to monitor the performance of such a network. There are many reasons for this desire. One is to locate illegal file/content downloading in order to prevent piracy. Another reason is to target advertising. Yet another reason is to understand and model Kad network performance and behavior in order to determine if such a network could be used in another application.

One approach for capturing Kad traffic is to randomly place a few instrumented peers within the network. Each instrumented peer passively monitors and logs traffic. While this approach may provide insight into a median peer's experience, the small sample size sheds little light on the typical Kad traffic pattern.

An alternative approach is to insert a large number of instrumented peers to monitor traffic at many points within the Kad network. Unfortunately, adding a large number of monitoring peers is impractical due to the requirement on computational resources. Even if it was possible, such a brute force approach artificially increases the number of peers in a Kad network, disturbing and changing the existing system, i.e., altering the traffic pattern of underlying network that the monitoring system was designed to monitor.

Mistral, developed by Steiner et al., is the closest known monitoring tool to the present invention, which is called Montra herein. The basic idea of crawling the network and using protocol features to add monitors to routing tables of actual peers is the same between the two techniques. However, the technique of the present invention introduces the concept of a monitor with least visibility (MLV). MLVs allow the Kad network to be monitored without disrupting the network. MLVs gracefully cope with churn and give a fairly accurate measure of traffic. Mistral, on the other hand, can disrupt the system.

SUMMARY OF THE INVENTION

Through the present invention, a technique has been developed to capture Distributed Hash Table (DHT) traffic without affecting/disturbing the underlying system. The present invention monitors the destination traffic of peers whose IDs fall into a range of a continuous ID space. One instrumented Kad peer is deployed per peer to monitor its traffic. The visibility of monitors is limited so as to minimize the disruption caused by the large number of monitors.

A method and apparatus are described including determining if a received message is from a monitored peer, forwarding said received message to a coordinator responsive to said determination, determining if the received message is a request message, opening a port for the peer responsive to the second determination, forwarding the request message to a monitored peer via the opened port and forwarding a response message to the monitored peer responsive to the second determination. Also described are a method and apparatus including determining if a received message is from a peer locator, clearing peers from a database responsive to the determination, generating a request message for each monitored peer in the received message responsive to the determination, forwarding the generated request messages to each monitoring peer, determining if the received message is a response message, marking a monitored peer responsive to the second determination, logging the received message, determining if the received message is a heartbeat message, determining if the heartbeat message is from a monitored peer responsive to the third determination, generating a response message responsive to the fourth determination and forwarding the response message to the monitoring peer. Further described are a method and apparatus including retrieving records from a file and searching for and matching records of the file based on a requested content identifier and an identification of a destination peer.

BRIEF DESCRIPTION OF THE DRAWINGS

The present invention is best understood from the following detailed description when read in conjunctions with the accompanying drawings. The drawings include the following figures described below.

DETAILED DESCRIPTION OF THE PREFERRED EMBODIMENTS

A naive approach for capturing DHT traffic is to deploy a few instrumented Kad nodes, namely monitors, randomly across a Kad network. These instrumented Kad nodes passively monitor and log observed traffic. The problem with this approach is how to determine proper number of monitors. A small number of monitors will not be able to capture enough traffic samples to draw reliable conclusions. On the other hand, a large number of instrumented Kad peers/clients/nodes will change the underlying system itself. Thus, the measurement result is influenced/changed by the monitoring tool. To address the above issue, the present invention classifies Kad traffic into two categories:

Destination Traffic: A peer receives this type of traffic when it is the closest peer or destination for a particular request. The destination traffic depends on a peer's position. As the position of a peer varies, observed traffic varies as well. This is because the content IDs, for which the peer is destination, vary in popularity.

Routing Traffic: A peer receives this type of traffic when it is an intermediate hop for a request and routes the traffic towards destination. The routing traffic depends upon a peer's visibility. As a peer becomes more visible in the network, more peers use it for routing.

Routing traffic is a direct consequence of the destination traffic coupled with the Kad routing protocol. Since the structure of the Kad P2P network is well understood in theory and can be measured efficiently using a crawler, it is sufficient to measure the destination traffic and derive the properties of a Kad system. In addition, it turns out that measuring the destination traffic alone is much more tractable.

The present invention captures the Kad destination traffic observed by a single peer, called target peer Pt, by placing a monitor (Pm) adjacent to Pt in the ID space such that no other peer lies between Pm and Pt. In this scenario, whenever Pt receives a destination request, it always informs the request originator Pr about the existence of Pm, even if Pt itself is the closest peer to the requested ID (content). Pt behaves this way because, in Kad, global decisions about finding the closest possible node to a requested ID are made at Pr. Pt is only responsible for making a local decision to find n closest possible peers to the requested ID based on its own routing table. As a result, Pt always selects Pm along with other peers, for all the destination requests because according to Pt's routing table, Pm is the closest peer to the requested ID. Once Pr learns about Pm then Pr sends the same request to Pm, which achieves a goal of the present invention. This process is shown in FIG. 1.

Figure 1:
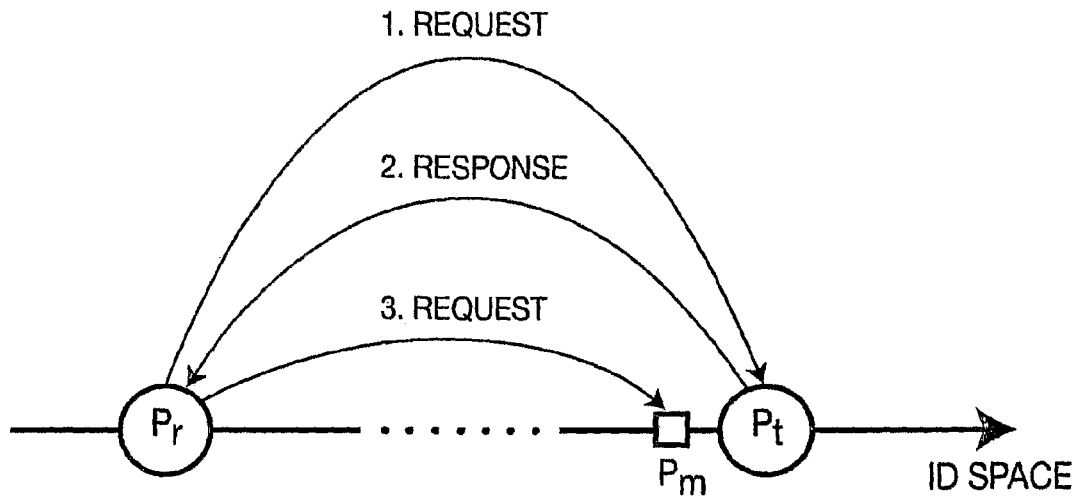
FIG. 1 shows the basic flow of messages between the requesting peer (Pr), the target peer (Pt) and the monitoring peer (Pm).

FIG. 1 shows the interaction between the request originator, the target and the monitor as follows:
1. Pr sends a request for a given ID to Pt.
2. Pt sends a response to Pr, which contains the contacts of next hop nodes. If Pt is the closest node to the requested ID then Pt includes the ID of Pm in its response.
3. Since Pr wants to find n closest nodes to the requested ID, it sends the same request to Pm even though the closest node to the request has been found.

This strategy allows traffic from a single node in Kad to be captured. However, traffic from multiple points in the network must be observed in order to capture the representative traffic. A large number of samples must be collected without affecting the peer population. This is accomplished by keeping the monitors minimally visible. The basic idea is to make the monitor visible to the target node however not to other nodes in the network. This enables a monitor to receive all the destination traffic observed by a target node, without affecting any other nodes in the network. A target node learns about the existence of a monitor when the monitor is added to its routing table. Based on the routing table of a target node, a monitor is always the closest peer for a destination request because the target node does not add itself to its own routing table. Thus, whenever a target node observes a destination request, it always informs the query originator (requester, Pr) about the presence of the monitor. As a result, the query originator sends a request to the monitor, which allows the monitor to observe the destination traffic without affecting the Kad network and its function. The monitor remains minimally visible by only responding to heart beat (HELLO REQUEST) messages from the target node. All the other messages from any other node in the network are logged but are not responded to. As a result, every other node in the network considers the monitor to be a dead node. But the target node considers the monitor to be alive because it receives responses to heart beat messages.

How a monitor identifies the destination traffic of the monitored node, i.e., how a given monitor distinguishes routing traffic from destination traffic and filters out the routing traffic is now described.

This present invention solves this problem by monitoring a continuous zone of Kad ID space. The idea is to monitor all the nodes that share the same n high order bits. The n high order bits are the zone prefix. For example, if n=8 and zone prefix is 0xa4, the zone includes all nodes whose high order 8 bits match 0xa4. The high order bits are the most significant bits. That is, the address is big-endian.

Any request that matches the zone prefix and enters the monitored zone is bound to have a destination in that zone. As a result, all the requests, which are captured by the monitor, must be destination requests. Some intermediate monitors may observe these requests as routing requests and one monitor finally observes the request as destination request. The monitors log all the observed requests. In the off-line post measurement processing, all the logs are compared. The Kad node that is the closest to a given request is considered to be the actual destination node, while the requests observed by other monitors are discarded as routing requests. The available computational power and network bandwidth limit the size of monitored zone. 6 bit zones on a Core 2 Duo—2.2 GHz machine with 1 GB RAM have been successfully been monitored, dropping a very small fraction of packets.

While the above mentioned approach is extremely lightweight and causes minimal disruption, only the following information can be extracted from the observed traffic:
Type of Request: PUBLISH or SEARCH
Requested Content ID
Destination Node ID i.e. the ID to which the request was sent Based only on the above SEARCH/PUBLISH requests, Keywords and Files cannot be distinguished. Hence nothing can be learned about different characteristics of files that are being searched or published. To address these limitations, the present invention can be extended at the cost of introducing minimal disruption to the system. Any SEARCH or PUBLISH request from a Kad client progresses in two phases. When a monitor receives a request from the first phase, it sends a response. The response does not carry any next hop contacts but it informs the request originator (Pr) that the monitor is alive and can receive a request during the second phase. As a result, the monitors of the present invention receive SEARCH/PUBLISH requests, which carry additional information about files and keywords being searched/published.

This extension/enhancement causes minimal disruption to regular operation of the system. As a result of this addition, when content is published, instead of being published at 10 closest possible nodes, it is published at 9 nodes. The monitors of the present invention log the published information but do not maintain it as this is an additional overhead. Also, when SEARCH requests are sent to 300 closest possible nodes then 299 nodes will respond to the query. Since the monitors of the present invention do not maintain published information, it is not possible to send responses to SEARCH requests. Also, responding to the request messages results in more visible monitors which lead to system disruption as well.

To avoid these shortcomings of the extension, requests for a given content ID are responded to only once. When an actual SEARCH/PUBLISH request for a given content ID is received, the following information about that ID is extracted and stored into the database:

Type of Content represented by the content ID i.e. either FILE or KEYWORD

Size of the File, provided the content ID represents a FILE.

Once the above information about a content ID is extracted/learned, no response is made to any requests for that ID and this information is treated as valid for all further requests.

Figure 2:
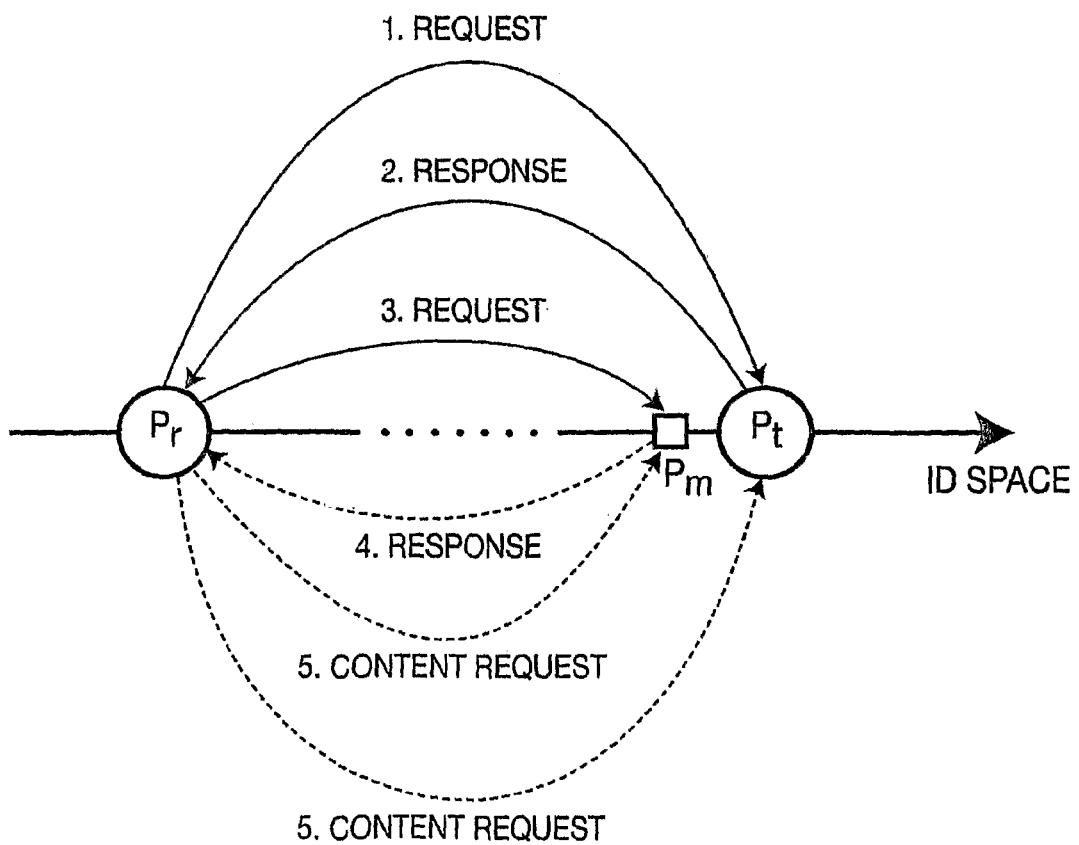
FIG. 2 shows the enhanced flow of messages between the requesting peer (Pr), the target peer (Pt) and the monitoring peer (Pm).

This extension to the present invention is shown in FIG. 2, which augments FIG. 1 with the additional communication flows/paths. The solid arrow lines show the mandatory messages as described above for FIG. 1. If any of these messages is lost then Pm will not be able to observe the packet. The newly added dotted arrow lines show optional messages that are necessary to extract further information.

Optional message exchanges are as follows:

If Pm has never received any request for this ID (content) before then it sends a response to Pr. The response messages do not contain any contacts. Response messages inform Pr that Pm is alive. This is message flow 4 on FIG. 2.

Pr sends actual SEARCH/PUBLISH request for content to both Pm and Pt. This is flow 5 on FIG. 2.

The Lightweight Kad monitor tool is described below. A python-based Kad client was modified and used as a virtual node. Instead of running one separate monitor to monitor a Kad node, one virtual node is executed that simulates the presence of multiple peers. This is possible by monitoring the traffic of different nodes using different ports. For example, if the client is monitoring a population of 4000 peers, the virtual node opens 4000 ports, and listens for the messages related to individual monitored nodes. In addition, the virtual node makes it possible to share monitoring state information, including content ID, keyword ID, node IDs in the monitored zone, etc. This information is essential in identifying destination traffic as well as the type of destination traffic.

A Kad crawler is known in the art and is used to locate all the peers in a monitored zone. The Master selects a zone to be monitored. A zone is a specific small section of the Kad network typically on the order of $\frac{1}{64}$ of the network. The Master advises the crawler which zone to monitor. The crawler starts with a few known contacts in a given zone and downloads their routing tables. In order to download a routing table from a single peer, the crawler generates targeted query IDs based on the target peer ID. The crawler then sends request messages for the generated query IDs to the target peer. The peer responds to those queries with response messages, containing contacts, as it would respond to any request message, thus informing the crawler about a part of its routing table. By sending such queries, the crawler can download the entire routing table of the target peer. The crawler then repeats the same process with every discovered contact in the zone and thus incrementally learns about all the peers in a given zone. The crawler runs on a six node cluster.

While crawling, the crawler must avoid peers behind network address translation (NAT) boxes. Such peers do not participate in routing and, as a result, cannot be monitored. These peers are registered with the Kad network because, just like any other peer, they respond to all HELLO REQ messages. However, every message sent by a peer behind a NAT box is sent from a different port, which is open only for a short period of time. As a result, all routing messages sent towards a peer behind a NAT box are not delivered.

Given the continuously changing peer population of a P2P system, crawling a given zone only once is not adequate. Since the present invention needs to monitor all nodes in a given zone, the arrival of new peers in the zone must be detected quickly. This is achieved by performing back-to-back crawls, i.e. a new crawl starts as soon as the current crawl ends. Back-to-back crawls also help the present invention to learn about missed contacts. Since Kad uses user datagram protocol (UDP) for almost all the communication except for file transfer, it is possible that some UDP packets are lost during a crawl and these contacts are left undiscovered. This is because UDP does not guarantee reliability or ordering.

The present invention works accurately without detecting departure of individual peers. When a target node leaves the network, the monitor for that particular node will stop receiving the traffic because of its limited visibility. However, in order to save memory and recycle port numbers, the present invention still detects peer departure by comparing back-to-back crawls. The data collected for the departed peers is discarded using the heuristic that if a given peer does not respond for m consecutive crawls then it is considered dead. In experiments m was set to 4. A departed node/peer is no longer "live". That is, the departed node/peer is no longer a member of the Kad network.

In order to add a monitor to the routing table of a target node Kad's HELLO REQUEST and HELLO RESPONSE messages are used. The HELLO REQUEST messages are normally used by a Kad client to determine if a new or existing peer is alive. A HELLO RESPONSE message is sent by peer in response to a HELLO REQUEST message to confirm its liveliness. A combination of HELLO REQUEST and HELLO RES messages are used, depending on the eMule version used by the target nodes, to add the monitors of the present invention to the routing tables. Monitors are added to clients with versions between 0.45a (when eMule started supporting Kad) and 0.47a by sending a single HELLO RESPONSE. For versions between 0.47b and 0.48a, 2 HELLO REQUEST messages are sent to each client. This activity is performed by the virtual node. The virtual node detects the software version by using the information embedded in the HELLO REQUEST and HELLO RESPONSE messages and then adapts the sequence of registration messages accordingly.

The implementation of the Listener of the presentation was kept as lightweight as possible so that the Listener can receive a maximum number of packets without dropping them. Thus, the Listener's only responsibility is to efficiently send and receive messages. The Listener does not maintain any information about target peers, analyze requests, log requests or generate responses. In order to optimize the Listener's performance, another component called the Master has been added. The Master acts as a coordinator between the Listeners and the crawler. A Listener establishes a TCP connection with the Master and sends every received packet to the Master. The Master logs all the packets, generates responses based on peer information and sends the generated response back to the Listener, which sends the packet (generated response) back to the request originator. The crawler also establishes a TCP connection with the Master and informs the Master about all newly discovered contacts (new Pms). The Master maintains this information and informs the Listener to monitor new contacts. The Master also keeps track of those peers which have departed the system. When a peer departs the system, the Master informs the Listener to stop monitoring that particular peer.

Figure 3:
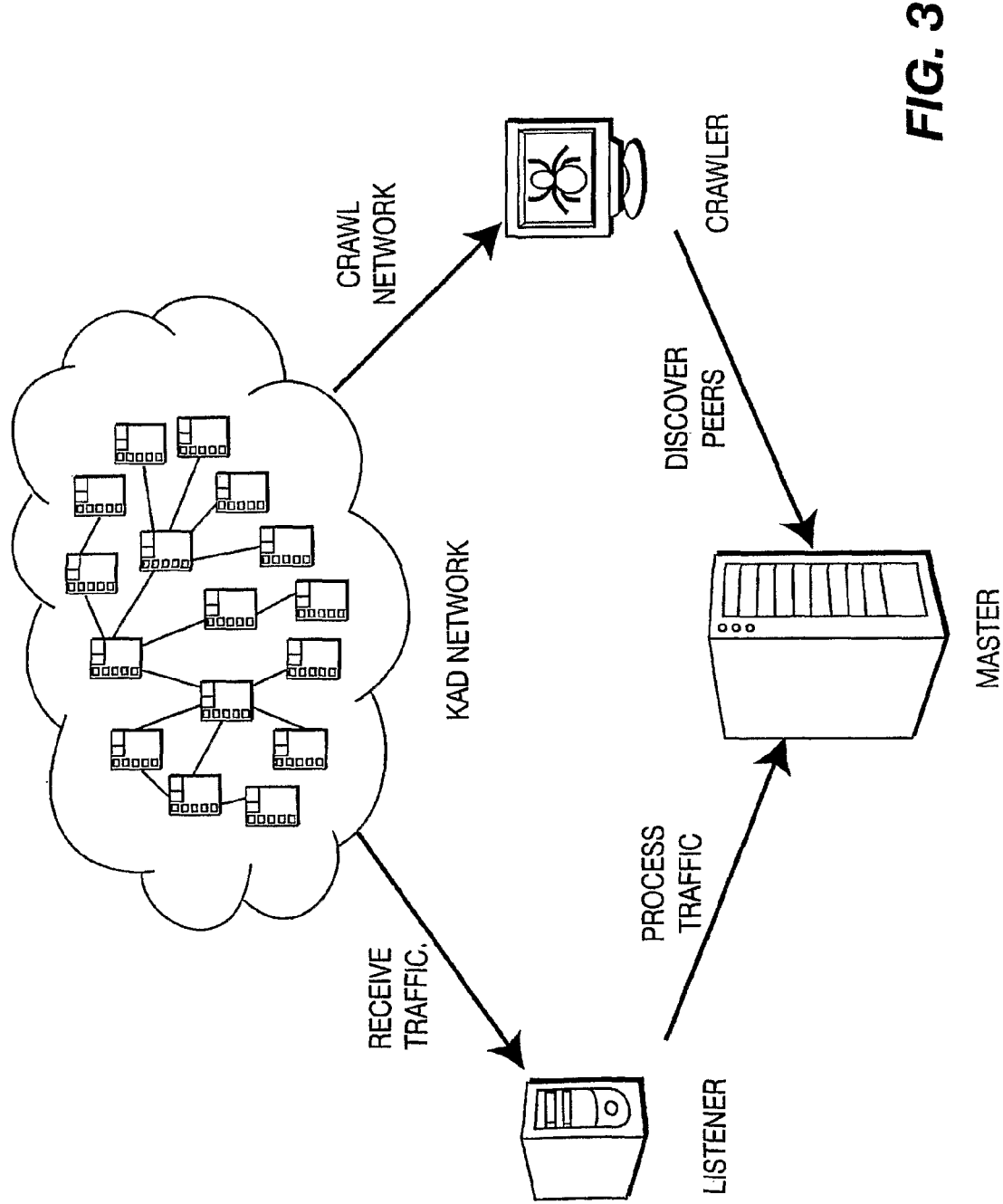
FIG. 3 shows the components of the monitoring system of the present invention.

The complete topology of Montra (the present invention) is depicted in FIG. 3. The Master advises the crawler which zone to monitor and instructs the crawler to discover peers/nodes in that zone. The crawler then discovers peers/nodes in that zone by crawling the network and reports back to the Master. The Master provides this information to the Listener which spawns monitoring nodes/peers (Pms). The Pm nodes/peers spawned by the Listener behave as described above reporting results to the Master for logging and later data analysis.

Figure 4:
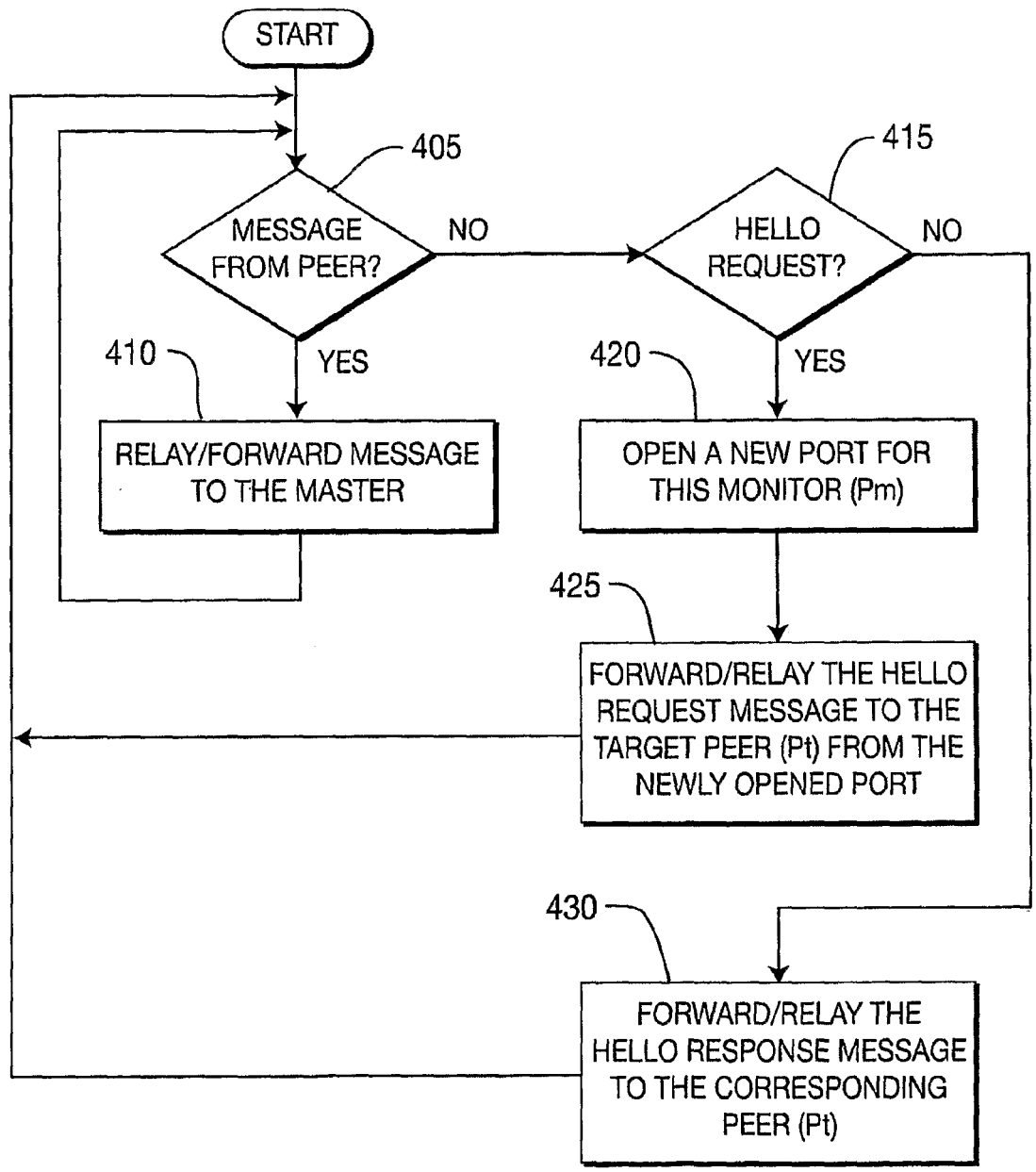
FIG. 4 is a flowchart of the Listener of the monitoring system of the present invention.

FIG. 4 is a flowchart of a Listener of the monitoring system of the present invention. In FIG. 4, Listener has two threads to handle the incoming messages from Master and monitored Kad nodes/peers, respectively. Once it receives a message from Master, it determines if it is a HELLO REQUEST or HELLO RESPONSE message. If the message is HELLO RESPONSE, it simply forwards/relays this message to the corresponding peer (the corresponding peers' IP address and port number are included in the message sent from Master). If the message is HELLO REQUEST message, the Listener starts/spawns a new monitor node/peer (Pm) to monitor a new peer. It opens a new port for this monitor node/peer, and forwards the HELLO REQUEST message to the target peer from the newly opened port. If a message from one of the monitored peers/nodes is received, the Listener relays the message to Master. Listener and Master work cooperatively to monitor the Kad network. The Listener serves as an interface to receive/forward messages, while Master generates response messages based on the monitoring strategy. This way Listener is light-weight. The monitoring tool can monitor a large number of peers simultaneously/concurrently.

Specifically, at 405 a test is performed to determine if the received message is from a monitored peer/node (Pt). It should be noted that a test could determine if the message is from the Master as easily. The message has to be from either the Master or a monitored node/peer (Pt) or there is an error so if it is determined that the message did not come from a monitoring node/peer (Pt) then no further test is performed to confirm that the message came from the Master although such a test could be provided/performed. At 410 the message received from the monitored peer/node (Pt) is forwarded to the Master. Processing continues at 405. At 415 a test is performed to determine if the message received from the Master is a HELLO REQUEST. Similar logic should be understood here. A message received from the Master must be either a HELLO REQUEST or a HELLO RESPONSE or there is an error. A test could be performed for either of these messages assuming if it was not the message tested for then it must be the other message or there was an error. A test to confirm that the message was the other message could be provided/performed. At 420 the Listener opens a new port for this new monitored node/peer (Pt). AT 425 the Listener forwards/relays the HELLO REQUEST message to the target peer from the newly opened port. Processing continues at 405. If the message was not a HELLO REQUEST then the message must have been a HELLO RESPONSE so at 430 the message is forwarded/relayed to the corresponding peer.

Figure 5:
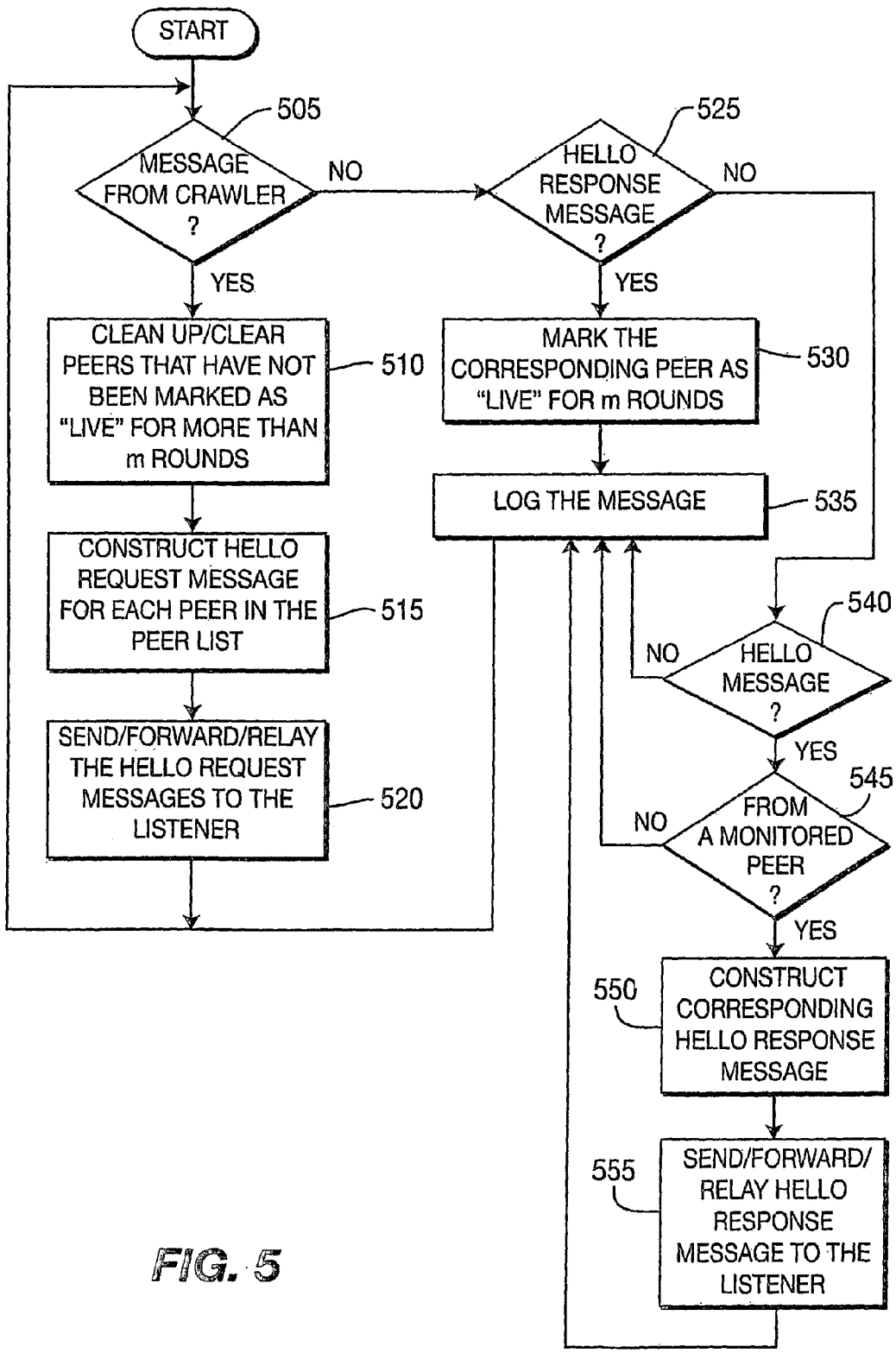
FIG. 5 is a flowchart of the Master of the monitoring system of the present invention.

FIG. 5 is a flowchart of the Master of the monitoring system of the present invention. In FIG. 5, the Master has two threads, one dealing with the communication with crawler, and the other dealing with the communication with Listener. The crawler continuously crawls the Kad network to find the peers/nodes in the network. Once the peer/node list is passed to Master, the Master compares the new peer list with the existing peer list that is has. If a peer has disappeared from the peer list for more than m rounds, it will be eliminated from the peer list. The Master then constructs HELLO REQUEST messages for each peer in the peers list, and sends the HELLO REQUEST messages to Listener. The Listener then forwards the messages to corresponding monitored peers. When Master receives messages from the Listener, it first determines if the message is HELLO RESPONSE message. If it is, it marks the corresponding peer as alive and the peer is alive for m rounds. If the message is a HELLO REQUEST message, the Master determines if this HELLO REQUEST message is intended for a monitored peer, or an un-monitored peer. If it is for a monitored peer, the Master constructs a HELLO RESPONSE message and sends it to the Listener, who then relays it to the monitored peer. If it is for an un-monitored peer, then nothing is done. The Master logs the message into log file, and returns to wait for the next incoming message.

Specifically, at 505 a test is performed to determine if the received message is from the crawler. It should be noted that a test could determine if the message is from the Listener as easily. The message has to be from either the Listener or the crawler or there is an error so if it is determined that the message did not come from the crawler then no further test is performed to confirm that the message came from the Listener although such a test could be provided/performed. If the message is from the crawler then at 510, the Master cleans up/clears peers that have not been marked as "live" for more then m rounds. Peers/nodes that have not been marked as "live" for more than in rounds have departed the network. At 515 the Master constructs a HELLO REQUEST message from each peer in the peer list provided by the crawler. At 520 the Master sends/forwards/relays the HELLO REQUEST messages to the Listener. Processing continues at 505. At 525 a test is performed to determine if the received message is a HELLO RESPONSE message. If the received message is a HELLO RESPONSE message then the corresponding peer/node is marked as "live" for m rounds at 530. That is, the corresponding peer/node has not departed the network. At 535 the message is logged into the database for later analysis.

If the received message is not a HELLO RESPONSE message then at 540 a test is performed to determine if the received message is a HELLO message. If the message is not a HELLO message then processing continues at 535. If the received message is a HELLO message then at 545 a test is performed to determine if the received message is from a monitored peer/node. If the received message is not from a monitored peer/node then processing continues at 535. If the received message is from a monitored peer/node then a corresponding HELLO RESPONSE message is constructed at 550. The HELLO RESPONSE message is sent/forwarded/relayed to the Listener at 555. Processing continues at 535.

Figure 6:
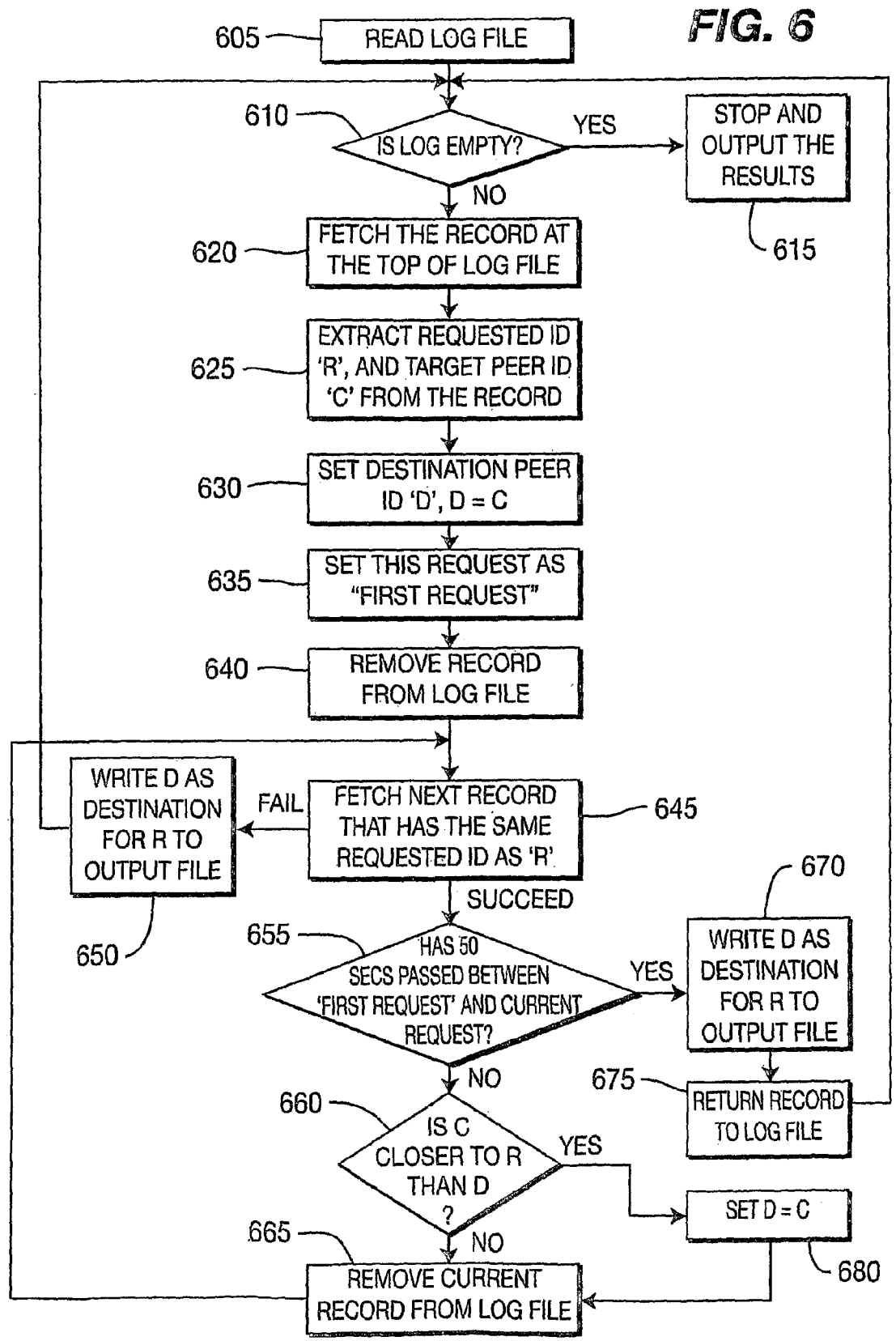
FIG. 6 is a flowchart of the offline data analysis performed on the data collected by the monitoring system of the present invention.

FIG. 6 is a flowchart of the offline data analysis performed on the data collected by the monitoring system of the present invention. FIG. 6 depicts how the log file is processed off-line to retrieve the destination traffic information. The log file is read in first at 605. A test is performed at 610 to determine if the log file is empty. If the log file is empty then processing stops and the results are output at 615. To start, the record at the top of the log file is fetched at 620. The requested ID, 'R', and targeted peer ID, 'C' are extracted from the record at 625. Destination peer ID, 'D', is set to be 'C' at 630. The next record in log file that carries the same requested ID 'R' is then fetched at 645. If such record is not found, 'D' is output as the destination peer for request ID 'R' at 650. The process starts again by fetching the record at the top of log file (Processing continues at 605). If such record is found, a determination is made if 50 seconds has elapsed since the first record with request ID 'R' was recorded at 655. If yes, 'D' is output as the final destination peer for 'R' (670), return this record back into the log file (675), and the process starts again by fetching the record at the top of the log file (605). If less than 50 seconds has passed, the destination peer ID 'C' of this record is compared with 'D' to see which one is closer to 'R' (660). The closer one is set to be 'D'. If C is closer to R than D then D is set to C at 680. If C is not closer to R than D then D is left unchanged. This record is removed from the log file (665), and the process continues to find next record that carries the same request ID 'R' (645). The above process continues until the log file is empty. The process described above can be performed on any general purpose computing device having storage, a display device, a hard copy output device (e.g., printer) and a communications interface device.

Figure 7:
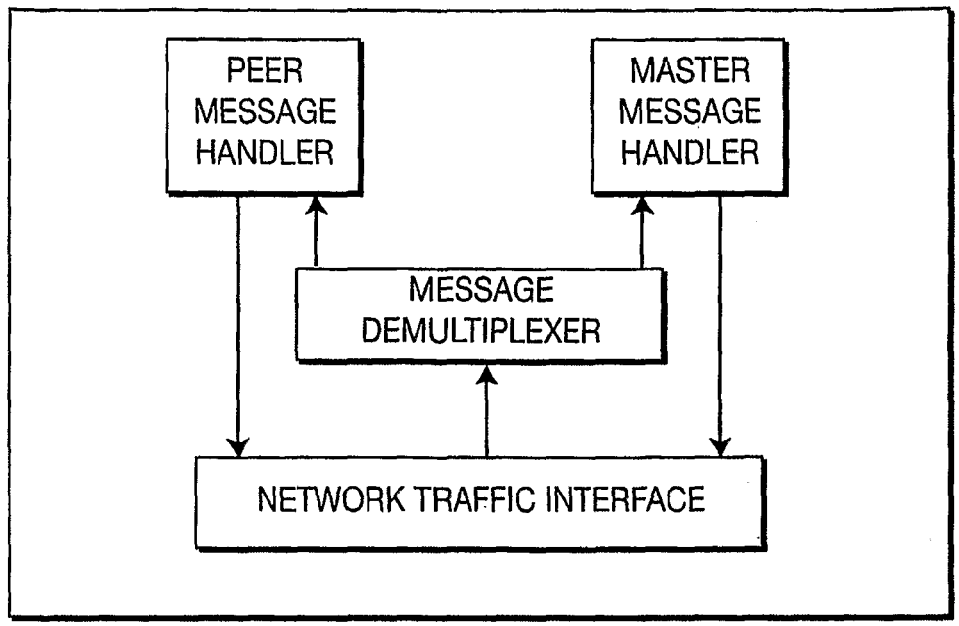
FIG. 7 is a block diagram of the architecture of a Listener.

FIG. 7 is a block diagram of the architecture of a Listener. The network traffic interface is responsible for sending and receiving messages including opening and closing ports. Upon receiving a message, the message demultiplexer forwards the message to different handling blocks according to the message type. If the message is from the Master, the master message handler is responsible for handling this message. Alternatively, the peer message handler handles the messages from Kad nodes/peers, specifically from the monitored peer. Using the methods described above and shown in FIG. 4, the peer message handler and master message handler process the incoming messages. The newly generated messages are forwarded to the network traffic interface so that the messages can be sent/forwarded/relayed to the appropriate receivers.

Figure 8:
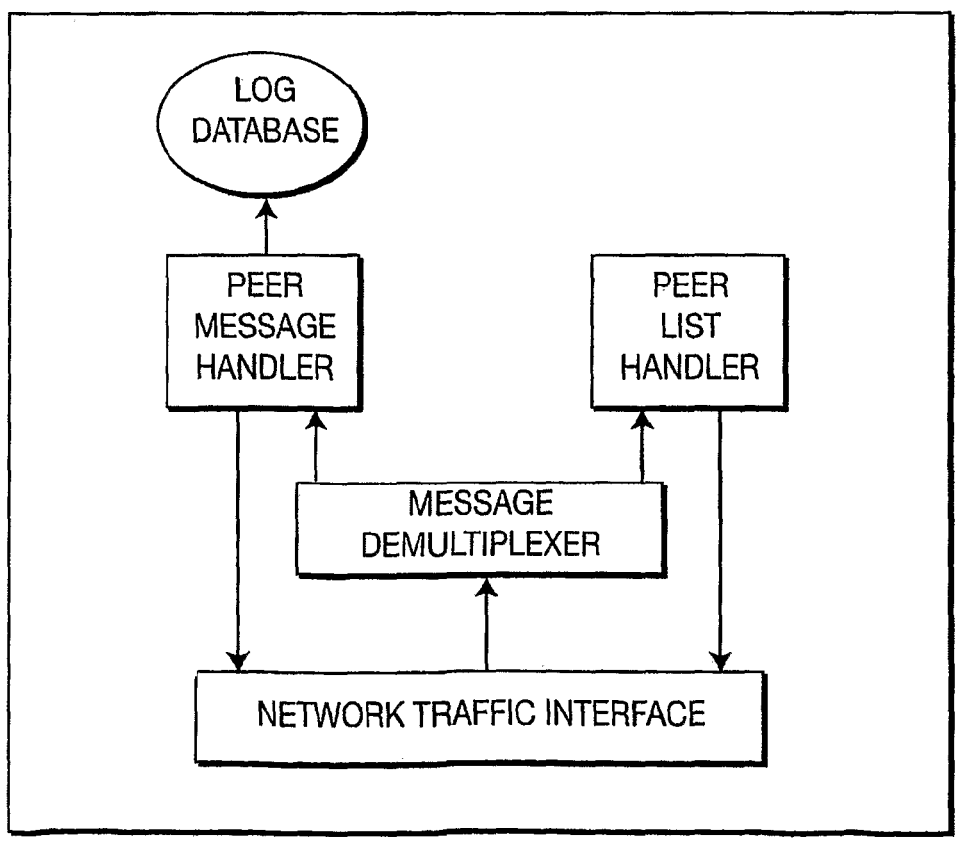
FIG. 8 is a block diagram of the architecture of the Master.

FIG. 8 is a block diagram of the architecture of the Master. Similar to the architecture of a Listener, the network traffic interface is responsible for sending and receiving messages. Upon receiving a message, the message demultiplexer forwards the message to different handling blocks based on the message type. If the message is a peer list from the Crawler, the peer list is forwarded to the peer list handler. The peer list handler processes the list using the methods described above and shown in FIG. 5. The generated messages are forwarded to the network traffic interface to be sent out/forwarded/relayed. If the incoming messages are from Kad nodes/peers, the messages are forwarded to the peer message handler. The peer message handler records the message in a log database. The peer message handler may also generate response messages. The response messages are forwarded to the network traffic interface to be sent out/forwarded/relayed to the appropriate receivers.

It is to be understood that the present invention may be implemented in various forms of hardware, software, firmware, special purpose processors, or a combination thereof. Preferably, the present invention is implemented as a combination of hardware and software. Moreover, the software is preferably implemented as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures are preferably implemented in software, the actual connections between the system components (or the process steps) may differ depending upon the manner in which the present invention is programmed. Given the teachings herein, one of ordinary skill in the related art will be able to contemplate these and similar implementations or configurations of the present invention.

The invention claimed is:

1. A method for monitoring a peer-to-peer network, said method comprising:

determining if a received message is from one of a plurality of monitored peers;

forwarding said received message to a coordinator when said received message is from one of the plurality of monitored peers;

determining if said received message is a request message when said received message is not from one of the plurality of monitored peers;

opening a port for a monitor node when said received message is a request message, the monitor node monitoring a respective target peer and only being visible to the respective target peer;

forwarding said request message to the target peer via said opened port; and forwarding a response message to one of the plurality of monitored peers when said received message is not a request message, wherein said response message is a heartbeat message.

2. The method according to claim 1, wherein said request message is a heartbeat message.

3. The method according to claim 1, wherein said coordinator is a master module.

4. The method according to claim 1, wherein said method is practiced over a third generation peer-to-peer network.

5. The method according to claim 4, wherein said third generation peer-to-peer network uses a distributed hash table to locate content.

6. An apparatus, comprising:

a network interface for receiving a message;

a message demultiplexer for determining if the received message is from one of a plurality of monitored peers; and a coordinator for receiving the received message from the message demultiplexer upon determining said received message is from one of the plurality of monitored peers; wherein said message demultiplexer determines if said received message is a request message when said received message is not from one of the plurality of monitored peers, the network interface opens a port for a monitor node when said received message is a request message, the monitor node monitors a respective target peer and only being visible to the respective target peer, and the network interface forwards said request message to the target peer via said opened port and forwards a response message to one of the plurality of monitored peers when said received message is not a request message, wherein said response message is a heartbeat message.

7. The apparatus according to claim 6, wherein said coordinator is a master module.

* * * * *